United States Patent [19]
Hiraga et al.

[11] 3,856,829
[45] Dec. 24, 1974

[54] 16β-HYDROCARBON SUBSTITUTED ESTRANE COMPOUNDS

[75] Inventors: Kentaro Hiraga, Kyoto; Kouichi Yoshioka, Toyonaka; Giichi Goto, Suita; Ryo Nakayama, Kawanishi; Michio Masuoka, Toyonaka, all of Japan

[73] Assignee: Takeda Chemical Industries, Ltd., Osaka, Japan

[22] Filed: Mar. 5, 1973

[21] Appl. No.: 338,060

Related U.S. Application Data
[63] Continuation of Ser. No. 102,271, Dec. 28, 1970, abandoned.

[30] Foreign Application Priority Data
Jan. 7, 1970  Japan................................. 45-2385

[52] U.S. Cl............. 260/397.4, 260/397.5, 424/243
[51] Int. Cl............................................. C07c 169/22
[58] Field of Search ...... /Machine Searched Steroids

[56] References Cited
UNITED STATES PATENTS

| | | |
|---|---|---|
| 3,049,555 | 8/1962 | Tyner............................. 260/397.4 |
| 3,207,753 | 9/1965 | Bowers et al.................. 260/239.55 |
| 3,280,157 | 10/1966 | Legatt et al..................... 260/397.4 |
| 3,376,295 | 4/1968 | Siddall........................... 260/239.55 |

OTHER PUBLICATIONS

Applezweig – Steroid Drugs, pp. 312, 319 & 551 (1962).

*Primary Examiner*—Henry A. French

[57] ABSTRACT

Novel 16β-hydrocarbon substituted estrane compounds are provided represented by the formula:

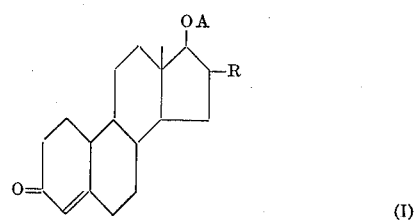

wherein A is hydrogen or an acyl radical and R is a hydrocarbon radical having at least 2 carbon atoms.

These novel compounds are characterized by a highly effective anti-androgenic activity.

13 Claims, No Drawings

16β-HYDROCARBON SUBSTITUTED ESTRANE COMPOUNDS

This application is a continuation of our co-pending application Ser. No. 102,271, filed on Dec. 28, 1970, and now abandoned.

The present invention relates to novel and useful 16β-hydrocarbon substituted estrane compounds and to a method for producing them, and more particularly to compounds of the formula:

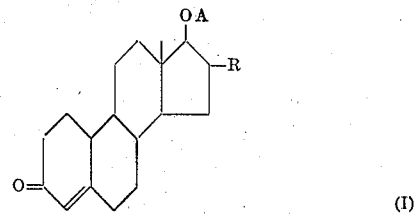

(I)

wherein A is hydrogen or an acyl radical and R is a hydrocarbon radical having at least 2 carbon atoms.

The majority of old men (about 70%) suffer from the prostatomegaly. They complain of dysuria (painful or difficult urination) and are exposed to suffering from anuresis or uremia. However, there has not been developed an effective remedy for the prostatomegaly. Although some compounds showing anti-androgenic activity were subjected to a clinical tests, most of them could not provide a remedy for the aforesaid condition because of their severe side effects such as marked atrophy of the adrenal gland, and thymus, as well as serious disorders in liver.

It has now been discovered unexpectedly that 16β-hydrocarbon substituted compounds (I) exhibit a very strong anti-androgenic activity, for example, the efficacy of 16β-ethyl-17β-hydroxyestra-4-en-3-one is about two to four times as strong as that of 2-acetyl-7-oxo-1,2,3,4,4a, 4b,5,6,7,9,10,10a-dodecahydrophenanthrene. Furthermore, it has been found that the compounds (I) do not produce considerable side effects in the suprarenal gland, thymus, pituitary gland and liver, etc., even after long-term administration. The acute toxicity of the compounds (I) is also very low, e.g. LD$_{50}$ of 16β-ethyl-17β-hydroxyestra-4-en-3-one is 5–10 g/kg. (rat, mouse) by intramuscular and intraperitoneal injection and more than 10 g/kg. (rat, mouse) by oral administration.

It is the principal object of the present invention to provide the novel and useful compounds of formula (I).

Another object of the present invention is to provide a method for producing the compounds of the formula (I).

A further object is to provide new pharmaceutical compositions containing compounds (I) and a method for employing the compounds (I) in the treatment of prostatomegaly.

Other objects of the present invention and advantageous features thereof will become apparent as the description proceeds.

In the 16β-hydrocarbon-substituted estrane derivatives (I), the substituent R at 16 position is a hydrocarbon radical having at least 2 carbon atoms, for example, a straight, branched or cyclic, saturated or unsaturated alkyl radical, an aralkyl radical and aryl radical such as ethyl, isopropyl, butyl, ethynyl propargyl, vinyl, allyl, cycloalkyl, phenyl, which are preferably of up to 6 carbon atoms.

Those groups may be further substituted with lower alkyl groups or halogens such as chlorine and bromine. The symbol A represents hydrogen or an acyl radical such as acetyl, propionoyl, valeryl, oenanthioyl, caprylolyl, caproyl, lauroyl, decylenoyl, cyclohexylbutyroyl, phenylpropionyl, palmitoyl, stearyl, phenoxyacetyl, tetrahydropiranyl, tetrahydrofuryl, tetrahydrothienyl, etc.

These compounds (I) may be prepared by subjecting 3-protected hydroxy-16β-hydrocarbon-substituted-estra-2,5(10) or 3,5-dien-17β-ol compounds or their esters to hydrolysis. The 3-protected hydroxy-16β-hydrocarbon substituted estra-2,5(10) or 3,5-dien-17β-ol compounds or their esters may be represented by the following formula:

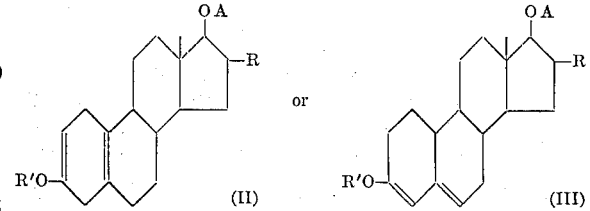

wherein R' is a hydrocarbon radical, for example, a straight, branched or cyclic, saturated or unsaturated alkyl radical, aralkyl radical and an aryl radical such as methyl, ethyl, propyl, t-butyl, benzyl, etc. or an acyl radical as defined above. The hydrolysis of compounds (II or III) is preferably conducted in a suitable solvent with the use of an acidic reagent such as an inorganic acid which may for example, be hydrochloric acid, sulfuric acid, nitric acid or phosphoric acid, or an organic acid which may, for example, be formic acid, acetic acid, oxalic acid or toluene sulfonic acid. The solvent just mentioned is selected from among various alcohols such as methanol, ethanol, butanol, etc., ethers such as tetrahydrofuran, ether, dioxane, etc., water or other common steroid solvents. The reaction goes to completion within a few hours, giving a 17β-hydroxy or acyloxy-16β-hydrocarbon-substituted-estra-4 or 5-en-3-one compound. Where the reaction is conducted under mild conditions, for example when the compounds (II or III) are hydrolyzed with formic acid or oxalic acid, the corresponding Δ$^5$ compound is obtained. On the other hand, hydrolysis with a mineral acid such as hydrochloric acid gives rise to the corresponding Δ$^4$ compound. When R' is an acyl radical, the hydrolysis may be also carried out under alkaline conditions employing e.g. alkali metal hydroxides such as sodium hydroxide, potassium hydroxide, an alkali metal carbonate such as sodium carbonate, sodium hydrogen-carbonate, potassium carbonate, alkali metal acylates such as sodium acetate, potassium acetate, quaternary ammonium hydroxides such as trimethyl benzyl ammonium hydroxide, tertiary amines such as triethylenediamine, anion exchange resins such as strongly basic styrenetype copolymer resins, alumina, basic solvents such as dimethylformamide, dimethylacetamide, pyridine, collidine, aldehyde collidine, etc. If it is desired to hydrolyze at the 3-position when both of A and R' are acyl radicals, mild alkaline or acidic conditions should be employed.

The starting compounds (II or III) may be prepared by the so-called Birch's reaction of the corresponding estra-1,3,5(10)-triene compounds, wherein the triene compounds are treated with an alkali metal in liquid ammonia. As the alkali metal, there may be used lithium, sodium or potassium. At times, use is made of such solvents as various ethers, e.g. ether, tetrahydrofuran, dimethoxyethane, etc. or alcohols, e.g. methanol, ethanol, tert-butanol, etc. The reaction is usually conducted at a temperature between the boiling point of ammonia and −80°C. Where R is an unsaturated alkyl radical there may be cases wherein the hydrocarbon group (e.g. allyl, phenyl, etc.) is saturated under the conditions described above. Where it is desired to prevent such saturation, the reaction may be conducted after the 17-hydroxy radical has been converted to tetrahydropyranylether, tetrahydrofurylether or tetrahydrothienylether, or to a ketal derivative of the 17-oxo radical.

17β-acyloxy-16β-hydrocarbon substituted-estra-4-en-3-ones may be prepared by acylating 16β-hydrocarbon substituted-estra-4-en-3-ones. This acylation is carried out with use of, for example, reactive derivatives of organic acid, such as an acid anhydride, a mixed anhydride, an acid halide, ketene or acid azide. Condensing agents such as carbodiimide, phosphoroxychloride etc. may be used with organic acids. The organic acid mentioned above may be a straight-chain fatty acid having up to 10 carbon atoms, a cyclic fatty acid having up to 10 carbon atoms such as cyclohexyl-propionic acid, cyclobutyl-propionic acid, phenoxyacetic acid, phenylpropionic acid or furylpropionic acid, etc. The acylating reaction is conducted in the presence of a catalyst which may be an alkaline catalyst such as, for example, pyridine, picoline, collidine, quinoline or a tertiary amine, e.g. triethylamine, or an acid catalyst such as for example, a Lewis acid, e.g. boron trifluoride, zinc chloride or aluminum chloride, para-toluene sulfonic acid or potassium hydrogen sulfate. The reaction is generally conducted in one of the common proton-inert solvents for steroids which include, among others, halogenated hydrocarbons, e.g. chloroform, methylene chloride, etc., hydrocarbons, e.g. toluene, benzene, hexane, etc., esters, e.g. ethyl acetate etc., dimethyl formamide, pyridine, picoline, etc. Alternatively, use may be made of a large excess of the acylating agent such as an organic acid anhydride or the like so that the acylating agent will also function as a solvent. The reaction usually proceeds at 0°C to room temperature, although the reaction may be hastened by heating the system up to about 100°C. After the reaction is complete, the reaction mixture may for example be treated with a large quantity of water so as to let the 17β-acyloxy derivatives crystallize or, alternatively, by extracting with an organic solvent to obtain the compound. When the 3-enolether is subjected to the acylation, there may be cases in which the 3-position remains unaffected by the acylation, but this product may generally be converted to the 4-en-3-one derivatives under acidic conditions. If the acylation reaction is carried out in the presence of an acid catalyst either under the influence of heat or for an extended period of time, the 3-position is also acylated to give 3,17β-diacylated compounds. These compounds may be readily hydrolyzed to the desired 17β-monoacylated compounds by being treated under mildly alkaline or acidic conditions. To establish the alkaline conditions, a solution of alkali hydroxide or alkali carbonate may be conventionally employed, while the acidic conditions may be conveniently established with the use of an alcoholic solution of an inorganic acid such as, for example, hydrochloric acid or sulfuric acid.

On the other hand, 17β-hydroxy-16β-hydrocarbon substituted-estra-4-en-3-ones may be prepared by subjecting to hydrolysis the compounds, e.g. represented by the following formulae:

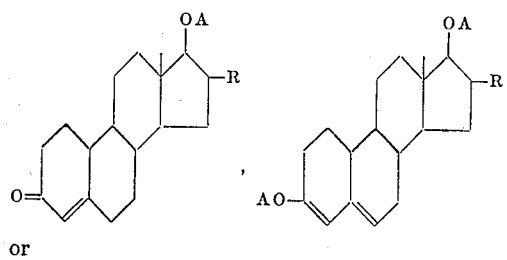

or

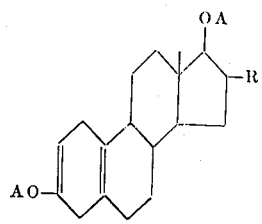

wherein A is an acyl radical and R is the same meaning as above. The reaction may be carried out under rather strong alkaline conditions as described above.

The thus obtained 16β-hydrocarbon substituted compounds (I) have strong anti-androgenic activity and are proved to be less active than the corresponding 16α-isomers, which have anabolic, androgenic, progestative, ovulation inhibiting and pregnancy-maintaining properties. Therefore, the compounds of formula (I) are useful as drugs for the inhibition of prostatomegaly and are generally administered orally as well as in an injectable form. They may be used for the treatment of, hirsutisum, acne, alopecia, Stein-Leventhal syndrome, etc. The injectable compositions are prepared, for example, by dissolving or suspending the compounds (I) in vegetable oils (e.g. sesame oil, cottonseed oil, castor oil, olive oil, corn oil, peanut oil, etc.) in combination, if desired, with antiseptics (e.g. benzyl alcohol, benzyl benzoate, chlorobutanol, etc.), solubilizing agents, surface active agents, etc. The concentration of the compounds (I) in oil injections is about 1 to about 200 mg/ml. Among the compounds (I), 17β-acyl derivatives are readily soluble in oils and exhibit relatively sustained anti-androgenic action. Taking 17β-caproyloxy-16β-ethylestra-4-en-3-one as an example, its anti-androgenic action is retained in vivo for more than about 3 weeks by the administration of 100–600 mg. When the compounds (I) are administered orally, they may be in the form of powders, tablets, capsules, pills, liquids, syrups, elixirs, buccals, granules, etc. They may also be used in the form of ointments, suppositories, etc. Some examples of practical formulations in which the compounds of this invention are utilized as remedies for prostatomegaly are as follows:

| Injectables | (1) | 16β-ethyl-17β-hydroxyestra-4-en-3-one-17β-ol | |
| --- | --- | --- | --- |
| | | sesame oil | 10 weight parts<br>1000 volume parts |
| | (2) | 17β-caproyloxy-16β-ethylestra-4-en-3-one | 200 weight parts |
| | | benzyl benzoate | 20 volume parts |
| | | sesame oil | 1000 volume parts |
| Capsules: | | 17β-caproyloxy-16β-ethylestra-4-en-3-one | 20 weight parts |
| | | lactose | 140 weight parts |
| | | corn starch | 50 weight parts |
| | | sugar ester | 4 weight parts |
| | | calcium salt of carboxymethylcellose | 4 weight parts |
| | | magnesium stearate | 2 weight parts |
| | | | 220 mg/capsule |
| Tablets: | | 17β-acetyloxy-16β-ethylestra-4-en-3-one | 20 weight parts |
| | | lactose | 100 weight parts |
| | | corn starch | 90 weight parts |
| | | sugar ester | 4 weight parts |
| | | calcium salt of carboxymethylcellose | 4 weight parts |
| | | magnesium stearate | 2 weight parts |
| | | | 220 mg/tablet. |

An effective dose of the compounds (I) when administered intramuscularly or subcutaneously is usually about 100–600 mg/week for an adult weighing 50 kg. For oral administration, the effective dose is about 50–600 mg/day for an adult weighing 50 kg. But, the dose and the dose interval may vary with the disease and/or the symptom.

It is to be understood that the following examples are solely for the purpose of illustration and are not to be construed as limitations of this invention, and that many variations may be resorted to without departing from the spirit and scope of this invention. In this specifications "kg.", "g", "ml" and "mg" are "kilogram", "gram", "milliliter" and "milligram" respectively. Temperatures are all uncorrected, and percentages are all on the weight basis.

EXAMPLE 1

1. To a solution of 3-methoxy-13β-methylgona-1,3,5(10)-trien-17-one (2.0 g) in 45 ml. of methanol, there are added 45 ml. acetone and 2 g. potassium hydroxide. The mixture is refluxed for 5 hours. After cooling, the reaction mixture is poured into ice-water, followed by extraction with ether. The ether is removed by distillation under reduced pressure, whereupon 2.0g. of an oil substance is obtained. Recrystallization from ether gives colorless needles of 3-methoxy-16-isopropylidene-13β-methylgona-1,3,5-(10)-trien-17-one (1.8 g). M.p. 155°C; Elemental analysis: Calcd. for $C_{22}H_{28}O_2$: C, 81.44; H, 8.70; Found: C, 81.64; H, 8.94; Ultra violet absorption: $\lambda_{max}^{EtOH}$ 248 Hμ.

2. To a solution of 3-methoxy-16-isopropylidene-13β-methylgona-1,3,5(10)-trien-17-one (1.0 g) in 150 ml. of ethanol is added 0.1 g. platinum oxide, whereby the material is catalytically reduced at atmospheric temperature and pressure. The catalyst is removed and, then, the solvent is distilled off under reduced pressure, whereupon crystals separate (1.0 g.). Recrystallization from methanol gives colorless needles of 3-methoxy-16β-isopropyl-13β-methylgona-1,3,5(10)-trien-17-one. M.p.109°–111°C; Elemental analysis: Calcd. for $C_{22}H_{30}O_2$: C, 80.93; H, 9.26; Found: C, 80.70; H, 9.28; Infrared absorption: $\nu_{max}^{KBr}$ 1740 $cm^{-1}$.

3. to a solution of 3-methoxy-16β-isopropyl-13β-methylgona-1,3,5(10)-trien-17-one (2.0 g) in 200 ml. of methanol is added 1.0 g. sodium borohydride at room temperature over a period of 30 minutes under constant stirring, and the mixture is allowed to stand for another 30 minutes.

The reaction mixture is poured into water and the crystals separating out are recovered by filtration, washed with water and dried (2.0 g.). Recrystallization from ether-n-hexane (1:1) yields colorless needles of 3-methoxy-16β-isopropyl-13β-methylgona-1,3,5(10)-trien-17β-ol. M.p. 136°C; Elemental analysis : Calcd. for $C_{22}H_{32}O_2$: C, 80.44; H, 9.83; Found: C, 80.16; H, 9.95; Infrared absorption: $\nu_{max}^{KBr}$ 3400 $cm^{-1}$.

4. A solution of 3-methoxy-16β-isopropyl-13β-methylgona-1,3,5(10)-trien-17β-ol (2.0 g.) in 80 ml. of anhydrous tetrahydrofuran is dissolved in liquid ammonia (300 ml.) at about −70°C, followed by the addition of 20 ml. dry ethanol.

Then, lithium metal is added with stirring over a period of 30 minutes.

The reaction mixture is further stirred for an additional 30 minutes, at the end of which time the ammonia is evaporated off. The residue is extracted with ether, which is then removed by distillation under reduced pressure. The procedure yields 2.0 g. of a colorless oil. This oil is dissolved in 80 ml. methanol and while the solution is stirred, 7 ml. of 6N-hydrochloric acid is added. The mixture is left standing for 20 minutes, at the end of which time the solution is poured into ice-water, followed by extraction with ether. The ether is removed by distillation under reduced pressure to recover 1.8 g. of a colorless oil. Recrystallization from ether-n-hexane (1:1) yields colorless needles of 17β-hydroxy-16β-isopropyl-13β-methylgon-4-en-3-one (1.6 g.). M.p. 145°–147°C; Elemental analysis: Calcd. for $C_{21}H_{32}O_2$: C, 79.70; H, 10.19; Found: C, 79.30; H, 10.34; Ultra violet absorption: $\lambda_{max}^{EtOH}$ Mμ (ε) 240 (15,600); Infra-red absorption: $\nu_{max}^{KBr}$ 1660, 1615 $cm^{-1}$; NMR (δ, $CDCl_3$) 3.76 ppm (17α-H, 1H,d,J=9HS).

5. By the similar procedures to those described in (1) to (4) above, 16β-cyclohexyl-17β-hydroxyestra-4-en-3-one is prepared starting from cyclohexanone and 3-methoxyestra-1,3,5(10)-trien-17-one. M.p.; 148–151°C. Ultra violet absorption; $\nu_{max}^{EtOH}$ 240 Mμ. Elemental analysis; Calculated for $C_{24}H_{36}O_2$, C; 80.85; H, 10.18; Found: C, 81.12; H, 10.05.

EXAMPLE 2

1. To a mixture of 4.0 g. of metallic magnesium and 150 ml. of dry ether, is added dropwise 10.5 ml. of ethyl iodide. To the thus obtained ether solution of ethyl magnesium iodide is added accompanied by stirring, 15 g. of 3-methoxy-16-oxoestra-1,3,5(10)-trien-17β-ol suspended in 100 ml. of dried ether. The mixture is left standing for 2 hours and then an aqueous solution saturated with ammonium chloride is added thereto to destroy the excess ethyl magnesium iodide. The resulting solution is extracted with ether. The ether layer is washed with water and dried, followed by evaporation of ether to give a colorless oil. The oil is recrystallized from ether to give 15.3 g. of 3-methoxy-16β-ethylestra-1,3,5(10)-trien-16β,17β-diol melting at 131–133°C. Elemental analysis: Calculated for $C_{21}H_{30}O_3$; C, 76.32, H, 9.15; Found: C, 76.04; H, 8.89.

2. To a solution of 20g. of 3-methoxy-16α-ethylestra-1,3,5(10)-trien-16β,17β-diol dissolved in 300 ml. of dry tetrahydrofurane, is added 500 ml. of liquid ammonia and then 100 ml. of ethanol under cooling with dry-ice-acetone. To the mixture is added little by little 7.0 g. of metallic lithium in 2 hours.

Then, ammonia is evaporated off from reaction mixture and to the resulting solution is added 200 ml. of water, followed by extraction with ether. The ether layer is washed with water and dried, followed by evaporating off the solvent to give a colorless oil. The oil is dissolved in 80 ml. of methanol and to the solution is added 1.5 ml. of concentrated hydrochloric acid under stirring. After standing for 10 minutes, 200 ml. of water is added to the reaction solution and the mixed solution is extracted with ether. The ether layer is washed with water and dried, followed by evaporation of the solvent to give 17.0 g. of 16β, 17β-dihydroxy-16α-ethylestra-4-en-3-one as a colorless oil. Ultra violet absorption; λ max 240 Mµ (in ethanol).

3. To a solution of 5.0 g. of 16β, 17β-dihydroxy-16α-ethylestra-4-en-3-one in 100 ml. of methanol 13 ml. of concentrated sulfuric acid is added under stirring. After standing for 15 minutes, the reaction solution is gradually poured into 300 ml. of a 10% aqueous solution of sodium hydrogencarbonate. The precipitated crystals are collected by filtration and washed with water. The crystals are recrystallized from ether to obtain 3.6 g. of 16β-ethylestra-4-ene-3,17-dione melting at 79–80°C. Elemental analysis: Calculated for $C_{20}H_{28}O_2$: C, 79.95; H, 9.39; Found: C, 79.93; H, 9.24.

4. To a solution of 3.0 g. of 16β-ethylestra-4-ene-3,17-dione dissolved in 150 ml. of dioxane, are added 15 g. of ethyl ortho-formate and 0.1 g. of p-toluenesulfonic acid, followed by stirring for 2 hours at room temperature. The reaction solution is poured into 300 ml. of a 5% aqueous solution of sodium hydrogencarbonate and the resultant mixture is extracted with ether. The ether layer is washed with water and dried, followed by evaporation of the solvent to give crude crystals of 3-ethoxy-16β-ethylestra-3,5-dien-17-one. The crystals are recrystallized from ether to give 3.0 g. of the compound melting at 114–115°C. Elemental analysis: Calculated for $C_{22}H_{32}O_2$: C, 80.44; H, 9.83; Found: C, 80.61; H, 9.56.

5. To a solution of 3.0 g. of the enol-ether compound obtained above (4) in 50 ml. of methanol, is added 1.5 g. of sodium borohydride. After stirring for 1.5 hour at room temperature, the reaction solution is poured into 300 ml. of water. The resulting precipitates are collected by filtration and recrystallized from ether to give 2.8 g. of 3-ethoxy-16β-ethylestra-3,5-dien-17β-ol melting at 131–133°C. Elemental analysis: Calculated for $C_{22}H_{34}O_2$: C, 79.95; H, 10.37; Found: C, 79.99; H, 10.41.

6. To a solution of 2.5 g. of 3-ethoxy-16β-ethylestra-3,5-dien-17β-ol dissolved in 50 ml. of methanol is added 1.2 ml. of concentrated hydrochloric acid, followed by stirring for 10 minutes. The reaction solution is poured into 250 ml. of water. The precipitated crystals are collected by filtration and recrystallized from ether to give 2.3 g. of 16β-ethyl-17β-hydroxyestra-4-en-3-one melting at 152–153°C. Elemental analysis: Calculated for $C_{20}H_{30}O_2$: C, 79.42; H, 10.00; Found: C, 79.53; H, 10.01 $[\alpha]_D = +41°$ (c=1.0, ethanol) Ultraviolet absorption: λ max mµ (ε) 240 (15800)

EXAMPLE 3

1. In 150 ml. of dioxane is dissolved 3.0 g. of 16β, 17β-dihydroxy-16α-ethylestra-4-en-3-one prepared in step (2) of Example 2 and to the solution is added 7.0 ml. of ethyl orthoformate and 0.5 g. of p-toluenesulfonic acid, followed by stirring for 15 minutes. The reaction solution is poured into 10% aqueous solution of sodium hydrogen-carbonate and the resultant solution is extracted with ether. The ether layer is washed with water and subjected to evaporation of the solvent to give 2.7 g. of 3-ethoxy-16β, 17β-dihydroxy-16α-ethylestra-3,5-diene.

2. To a solution of 3.1 g. of 3-ethoxy-16β,17β-dihydroxy-16α-ethylestra-3,5-diene in 30 ml. of pyridine, is added little by little 1.3 ml. of phosphoryl trichloride, followed by heating at 80°C for 5 minutes. The reaction solution is poured into 200 ml. of water and the resulting solution is extracted with ether. The ether layer is washed with water and subjected to evaporation of the solvent to give 1.6 g. of 3-ethoxy-16β-ethylestra-3,5-dien-17-one melting at 114–115°C. Elemental analysis: Calculated for $C_{22}H_{32}O_2$: C, 80.44; H, 9.83; Found: C, 80.61; H, 9.56.

3. The thus, obtained 3-ethoxy-16β-ethylestra-3,5-dien-17-one is reduced in a similar manner as described in (5) of Example 2 to obtain 3-ethoxy-16β-ethylestra-3,5-dien-17β-ol, which is further subjected to hydrolysis in a similar manner as described in (6) of Example 1 to obtain 16β-ethyl-17β-hydroxyestra-4-en-3-one.

EXAMPLE 4

1. In 100 ml. of methanol is dissolved 10 g. of 3-methoxy-16β,17β-dihydroxy-16α-ethylestra-1,3,5(10)-triene obtained in (1) of Example 2 and to the solution is added 10 ml. of concentrated sulfuric acid under stirring. After standing for 10 minutes, the reaction solution is poured into 300 ml. of a 10% aqueous solution of sodium hydrogencarbonate, followed by extraction with ether. The ether layer is washed with water and dried, followed by distillation of the solvent to give a pale yellow oil. The oil is recrystallized from methanol to obtain 8.2 g. of 3-methoxy-16β-ethylestrone melting at 94°C. Elemental analysis: Calculated for $C_{21}H_{28}O_2$: C, 80.73; H, 9.03; Found: C, 80.71; H, 9.09.

2. To a solution of 5.0 g. of 3-methoxy-16β-ethylestrone on 140 ml. of methanol, is added 20 g. of sodium borohydride under stirring. The solution is maintained in this condition for one hour. The reaction solution is poured into 300 ml. of water and the precipitated crystals are collected by filtration. Recrystallization from ether gives 4.7 g. of 3-methoxy-16β-ethylestra-1,3,5(10)-trien-17β-ol melting at 73°C. Elemental analysis: Calculated for $C_{21}H_{30}O_2$: C, 80.20; H, 9.62; Found: C, 79.96; H, 9.83.

3. To a solution of 10 g. of 3-methoxy-16β-ethylestra-1,3,5(10)-trien-17β-ol in 150 ml. of dried tetrahydrofurane are added 300 ml. of liquid ammonia and 30 ml. of ethanol under cooling with dry ice-acetone, and to the resulting solution is added little by little 4.0 g, of metallic lithium for 1.5 hour under stirring. After the deep blue color of the reaction solution is distinguished, ammonia is evaporated off. To the resulting solution is added 200 ml. of water and the mixture is extracted with ether. The ether layer is subjected to evaporation of the solvent to give a colorless oil. The oil is dissolved in 30 ml. of methanol and 3 ml. of concentrated hydrochloric acid is added to the solution, followed by stirring for 10 minutes. The reaction solution is poured into 100 ml. of water and precipitated crystals are recovered by filtration. Recrystallization from ether gives 8.6 g. of 16β-ethyl-17β-hydroxyestra-4-en-3-one melting at 152–153°C. Elemental analysis: Calculated for $C_{20}H_{30}O_2$: C, 79.42; H, 10.00; Found: C, 79.53; H, 10.01.

4. In a similar manner described in above (1) to (3) above, the following compounds are prepared:

TABLE 1

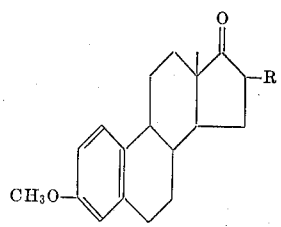

| R | M.P. (°C.) | Calculated for— Formula | C | H | Found C | H |
|---|---|---|---|---|---|---|
| =CH—CH₃ | 140–141 | $C_{21}H_{26}O_2$ | 81.25 | 8.44 | 81.19 | 8.49 |
| —CH₂—CH=CH₂ | 135–137 | $C_{22}H_{28}O_2$ | 81.44 | 8.70 | 81.32 | 8.79 |
| —⌬ | 150–151 | $C_{25}H_{28}O_2$ | 83.29 | 7.83 | 83.14 | 7.80 |
| —n-C₃H₇ | | $C_{22}H_{30}O_2$ | 80.93 | 9.26 | 80.99 | 9.38 |

TABLE 2

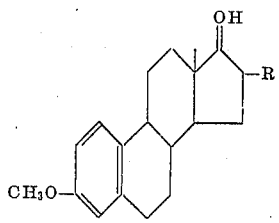

| R | M.P. (°C.) | Calculated for— Formula | C | H | Found C | H |
|---|---|---|---|---|---|---|
| =C—CH₃ | 140–141 | $C_{21}H_{28}O_2$ | 80.73 | 9.03 | 80.53 | 8.96 |
| —CH₂—CH=CH₂ | 138–140 | $C_{22}H_{30}O_2$ | 80.93 | 9.26 | 80.85 | 9.31 |
| —⌬ | 174–176 | $C_{2}H_{30}O_2$ | 82.83 | 8.34 | 83.00 | 8.28 |
| —n-C₃H₇ | 120–121 | $C_{22}H_{32}O_2$ | 80.44 | 9.83 | 80.51 | 9.63 |

TABLE 3

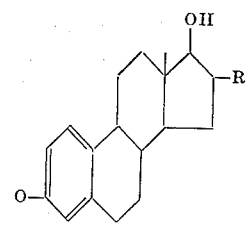

| R | M.P. (°C.) | Calculated for— Formula | C | H | Found C | H |
|---|---|---|---|---|---|---|
| =CH·CH₃ | 131–133 | $C_{20}H_{28}O_2$ | 79.95 | 9.35 | 79.99 | 9.30 |
| —CH₂CH=CH₂ | 137–138 | $C_{21}H_{30}O_2$ | 80.21 | 9.62 | 80.01 | 9.69 |
| —⌬ | 160 | $C_{24}H_{30}O_2$ | 82.24 | 8.63 | 82.19 | 8.64 |
| —n-C₃H₇ | 149–151 | $C_{21}H_{32}O_2$ | 79.70 | 10.19 | 79.80 | 10.03 |

EXAMPLE 5

5.0 g. of 17β-hydroxy-16β-ethylestra-4-en-3-one is dissolved in dry pyridine (100 ml.), followed by the addition of 15 g. of acetic anhydride under stirring. After the resulting solution is allowed to stand for 6 hours at room temperature, it is poured into a large amount of ice water. The precipitating crystals are collected by filtration and washed with water, whereupon 5.2 g. of 17β-acetyloxy-16β-ethylestra-4-en-3-one is obtained. M.p. 113–114°C; Elemental analysis: Calculated for $C_{22}H_{32}O_3$: C, 76.70; H, 9.36; Found: C, 76.74; H, 9.28; Ultra violet absorption: $\lambda_{max}^{EtOH}$ mμ (ε) 240(16300).

EXAMPLE 6

20 g. of 17β-hydroxy-16β-ethylestra-4-en-3-on is dissolved in caproic anhydride (100 ml.), followed by the addition of 3.0 g. p-toluenesulfonic acid under stirring and the mixture is allowed to stand for 2 hours at room temperature.

Excess caproic anhydride is removed by steam distillation, and the resulting substance is extracted with ether and then the ether is distilled off, whereupon 25 g. of 16β-ethylestra-3,5-diene-3,17-diol-3,17β-dicaproate is obtained, m.p. 62–63°C. Ultra violet absorption: $\lambda_{max}^{EtOH}$ 236 mμ 24 g. of the above dicaproate is dissolved in methanol (200 ml.), followed by the addition of 5% hydrochloric acid (30 ml.). The mixture is refluxed for 30 minutes. After being cooled, the reaction mixture is poured into water (500 ml.), followed by extraction with ether. Removal of ether by distillation leaves 21 g. of 17β-caproyloxy-16β-ethylestra-4-en-3-one, m.p. 70–71°C; Elemental analysis: Calculated for $C_{26}H_{40}O_3$: C, 77.95; H, 10.07; Found: C, 77.97; H, 10.11: Ultra violet absorption: $\lambda_{max}^{EtOH}$ mμ (ε) 240(15300).

EXAMPLE 7

3 g. of 17β-hydroxy-16β-ethylestra-4-en-3-one is dissolved in dry pyridine (20 ml.), followed by the addition of 1.5 g. of caproyl chloride under ice-cooling. The mixture is left standing at that temperature for 30 minutes, at the end of which time it is poured into 100 ml. of icewater. The crystalline powder is recovered by filtration, and washed with water, whereupon 2.7 g. of 17β-caproyloxy-16β-ethylestra-4-en-3-one is obtained.

EXAMPLE 8

1. To a solution of 5 g. of 3-ethoxy-16β-ethylestra-3,5-dien-17β-ol 100 ml. of pyridine is added 30 ml. of acetic anhydride, followed by heating at 40°C for 5 hours. The reaction mixture is poured gradually into 300 ml. of ice-water and the precipitates are collected by filtration, followed by washing with water. The crude crystals (5.0 g.) of 3-ethoxy-17β-acetoxy-16β-ethylestra-3,5-diene is dissolved in 150 ml. of methanol and to the resultant solution is added 3 ml. of concentrated hydrochloric acid, followed by being left standing for 10 minutes. The reaction solution is poured into 400 ml. of water. The precipitating steroid is collected by filtration and washed with water. After recrystallization from ether there is obtained 4.7 g. of 17β-acetyloxy-16β-ethylestra-4-en-3-one melting at 113–114°C. Elemental analysis: Calculated for $C_{22}H_{32}O_3$: C, 76.70; H, 9.36 Found: C, 76.74; H, 9.28

EXAMPLE 9

To a solution of 4.5 g. of 17β-acetoxy-16β-ethylestra-4-en-3-one in 300 ml. of methanol is added 70 ml. of a 5% methanolic solution of sodium hydroxide, followed by heating at 60°C for 1.5 hours. The reaction solution is poured into 300 ml. of water to precipitate crystals which are recovered by filtration. After washing with water, the crystals are recrystallized from ether to give 4.1 g. of 16β-ethyl-17β-hydroxyestra-4-en-3-one melting at 152–153°C. Ultra violet absorption: $\lambda_{max}^{EtOH}$ 240 mμ (ε=14,900). Elemental analysis: Calculated for $C_{20}H_{30}O_2$: C, 79.42; H, 10.00; Found: C, 79.53; H, 10.01

EXAMPLE 10

To 5.0 g. of 17β-hydroxy-16β-ethylestra-4-en-3-one in 100 ml. of dry pyridine is added 10 ml. of propionic anhydride, followed by heating at 70°C for 10 hours. The reaction mixture is poured into 300 ml. of 10% sodium hydrogencarbonate, followed by extraction with ether. The ether is washed with water and dried with anhydrous sodium sulfate. The solvent is distilled off, whereupon a colorless oil is separated. Recrystallization from hexane gives 3.7 g. of 17β-propionoyloxy-16β-ethylestra-4-en-3-one melting at 45–47°C. Elemental analysis: Calculated for $C_{23}H_{34}O_3$: C, 77.05; H, 9.56: Found; C, 77.11; H, 9.59; Ultraviolet absorption; λ max 239 mμ.

EXAMPLE 11

To 3.0 g. of 16β-ethyl-17β-hydroxyestra-4-en-3-one in 150 ml. of dry pyridine is added 5 ml. of phenoxyacetyl chloride under ice cooling. After standing for 10 minutes, the reaction mixture is poured into 300 ml. of water, followed by extraction with ether. The ether layer is washed with a 10% solution of sodium hydrogencarbonate, and then with water, and dried with anhydrous sodium sulfate.

The ether is distilled off, whereupon 2.9 g. of 17β-phenoxyacetyloxy-16β-ethylestra-4-en-3-one is obtained melting at 112–114°C. Elemental analysis; Calculated for $C_{28}H_{36}O_4$; C, 77.03; H, 8.31: Found: C, 77.12; H, 8.29. Ultra violet absorption; λ max 224,239,270,277 mμ.

Having thus described the invention, What is claimed is:

1. A compound of the formula:

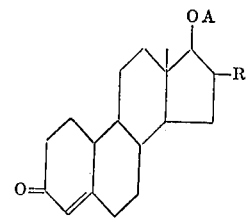

wherein A is hydrogen, a tetra hydropiranyl, a tetrahydrofuryl, or a tetrahydrothienyl radical or an organic carboxylic acyl radical having up to 18 carbon atoms and R is a hydrocarbon radical having 2 to 6 carbon atoms.

2. A compound as claimed in claim 1, wherein A is hydrogen.
3. A compound as claimed in claim 2, which is 16β-ethyl-17β-hydroxyestra-4-en-3-one.
4. A compound as claimed in claim 2, which is, 16β-n-propyl-17-hydroxyestra-4-en-3-one.
5. A compound as claimed in claim 2, which is, 16β-isopropyl-17β-hydroxyestra-4-en-3-one.
6. A compound as claimed in claim 4, which is, 16β-allyl-17β-hydroxyestra-4-en-3-one.
7. A compound as claimed in claim 2, which is, 16β-cyclohexyl-17β-hydroxyestra-4-en-3-one.
8. A compound as claimed in claim 2, which is, 16β-phenyl-17β-hydroxyestra-4-en-3-one.
9. A compound as claimed in claim 1, wherein A is an organic carboxylic radical having up to 10 carbon atoms.
10. A compound as claimed in claim 1, which is, 17β-acetyloxy-16β-ethylestra-4-en-3-one.
11. A compound as claimed in claim 1, which is, 17β-caproyloxy-16β-ethylestra-4-en-3-one.
12. A compound as claimed in claim 1, which is, 17β-propionoyloxy-16β-ethylestra-4-en-3-one.
13. A compound as claimed in claim 1, which is, 17β-phenoxyacetyloxy-16β-ethylestra-4-en-3-one.

* * * * *